US011455251B2

(12) United States Patent
Branover et al.

(10) Patent No.: US 11,455,251 B2
(45) Date of Patent: Sep. 27, 2022

(54) ENHANCED DURABILITY FOR SYSTEMS ON CHIP (SOCS)

(71) Applicant: Advanced Micro Devices, Inc., Santa Clara, CA (US)

(72) Inventors: Alexander J. Branover, Chestnut Hill, MA (US); Kevin M. Lepak, Austin, TX (US); William A. Moyes, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 35 days.

(21) Appl. No.: 17/095,229

(22) Filed: Nov. 11, 2020

(65) Prior Publication Data

US 2022/0147455 A1 May 12, 2022

(51) Int. Cl.
*G06F 12/08* (2016.01)
*G06F 13/16* (2006.01)
*G06F 12/0804* (2016.01)

(52) U.S. Cl.
CPC ...... *G06F 12/0804* (2013.01); *G06F 13/1668* (2013.01); *G06F 2212/1032* (2013.01)

(58) Field of Classification Search
CPC ............ G06F 12/0804; G06F 13/1668; G06F 2212/1032
USPC ...................................................... 711/143
See application file for complete search history.

(56) References Cited

U.S. PATENT DOCUMENTS

| | | | |
|---|---|---|---|
| 9,667,389 B2 | 5/2017 | Lee et al. | |
| 10,318,340 B2 | 6/2019 | Blagodurov et al. | |
| 10,970,225 B1* | 4/2021 | Mannava | G06F 12/0868 |
| 11,210,224 B2* | 12/2021 | Hong | G06F 12/0837 |
| 2015/0261674 A1* | 9/2015 | Wei | G06F 11/1471 |
| | | | 711/135 |
| 2016/0378660 A1 | 12/2016 | Gendler et al. | |
| 2016/0378701 A1* | 12/2016 | Niell | G06F 13/28 |
| | | | 710/308 |
| 2017/0038999 A1 | 2/2017 | Vanka et al. | |
| 2017/0060668 A1* | 3/2017 | Farhan | G06F 12/0871 |
| 2017/0149925 A1* | 5/2017 | Yang | H04L 43/0817 |
| 2017/0228316 A1* | 8/2017 | Steinmacher-Burow | |
| | | | G06F 12/084 |
| 2018/0032390 A1* | 2/2018 | Rahmanian | G06F 11/0754 |
| 2018/0032439 A1* | 2/2018 | Jenne | G06F 12/0804 |

(Continued)

FOREIGN PATENT DOCUMENTS

KR 102064890 B1 2/2020

OTHER PUBLICATIONS

International Search Report and Written Opinion for International Application No. PCT/US2021/057181, dated Feb. 17, 2022, 9 pages.

*Primary Examiner* — Christopher B Shin
(74) *Attorney, Agent, or Firm* — Polansky & Associates, P.L.L.C.; Paul J. Polansky

(57) ABSTRACT

A system-on-chip with runtime global push to persistence includes a data processor having a cache, an external memory interface, and a microsequencer. The external memory interface is coupled to the cache and is adapted to be coupled to an external memory. The cache provides data to the external memory interface for storage in the external memory. The microsequencer is coupled to the data processor. In response to a trigger signal, the microsequencer causes the cache to flush the data by sending the data to the external memory interface for transmission to the external memory.

29 Claims, 9 Drawing Sheets

(56) References Cited

U.S. PATENT DOCUMENTS

| | | | |
|---|---|---|---|
| 2018/0336034 A1 | 11/2018 | Warner et al. | |
| 2019/0042418 A1* | 2/2019 | Dutta | G06F 12/0868 |
| 2019/0129836 A1* | 5/2019 | Boyle | G06F 1/30 |
| 2019/0243759 A1* | 8/2019 | Stonelake | G06F 3/0608 |
| 2019/0354482 A1* | 11/2019 | Lee | G06F 12/0804 |
| 2019/0384837 A1* | 12/2019 | Kumar | G06F 12/0868 |
| 2020/0136943 A1 | 4/2020 | Banyai et al. | |
| 2020/0142774 A1* | 5/2020 | Rushing | G06F 12/0897 |
| 2020/0192789 A1* | 6/2020 | Peng | G06F 16/904 |
| 2021/0089225 A1* | 3/2021 | Boyd | G06F 1/30 |
| 2021/0182187 A1* | 6/2021 | Raghava | G06F 12/0804 |
| 2021/0182197 A1* | 6/2021 | Williams | G06F 12/0817 |
| 2021/0342266 A1* | 11/2021 | Sherlock | G06F 12/0804 |
| 2022/0035740 A1* | 2/2022 | Di Gregorio | G06F 12/0811 |

\* cited by examiner

ENHANCED DURABILITY FOR SYSTEMS ON CHIP (SOCS)

BACKGROUND

Computer systems are susceptible to occasional events that cause them to be temporarily shut down or powered off. For example, the electrical power to the building or home where the computer system is operating may suffer power loss due to brownouts, blackouts, or natural disasters. Moreover, the power supply of the computer system itself may fail. Another category of events that cause the computer system to be shut down is an application program or operating system failure that "locks up" the computer system and requires the user to manually reset it. Sometimes the condition requiring the computer to be shut down can be anticipated and critical data preserved before the shutdown. However, any data that was modified but not yet saved in persistent memory (e.g., nonvolatile memory, battery backed-up memory, hard disk drive, etc.) will be lost due to the loss of power or reset. In order to protect against such unexpected losses of data, application programs sometimes save data files periodically to persistent memory, and operating systems may intervene after one of these events is detected to save important data before the computer is shutdown.

Modern data processors routinely use caches, i.e. high-speed memory such as static random-access memory (SRAM) closely coupled to the data processor, to allow fast access for frequently used data and thereby to improve computer system performance. When an application program modifies data that has been allocated to a cache, the data processor typically keeps the copy in its cache in modified ("dirty") form until the cache needs to make room for other data and writes back the updated copy to memory. If an event requiring shutdown is encountered with adequate time before the shutdown, the application program or operating system may "flush" (i.e., write back) any dirty data from the cache to persistent memory, thereby allowing updates to critical data to be preserved and globally observable so that the user's work may be restored without loss when the computer system is later restarted.

Systems-on-chip (SOCs) combine various data processors, caches, queues, multiple layers of interconnect circuits, and input/output peripherals on a single integrated circuit chip. With the advent of deep sub-micron semiconductor manufacturing process technology, SOCs have become increasingly complex and may contain several data processor cores, multiple layers of caches, and highly buffered interconnect fabrics, making it difficult for application programs and operating systems running on these SOCs to ensure that their internal data is durable without having to rewrite the application software or operating system to have knowledge of the details of the SOC.

Figure 1:
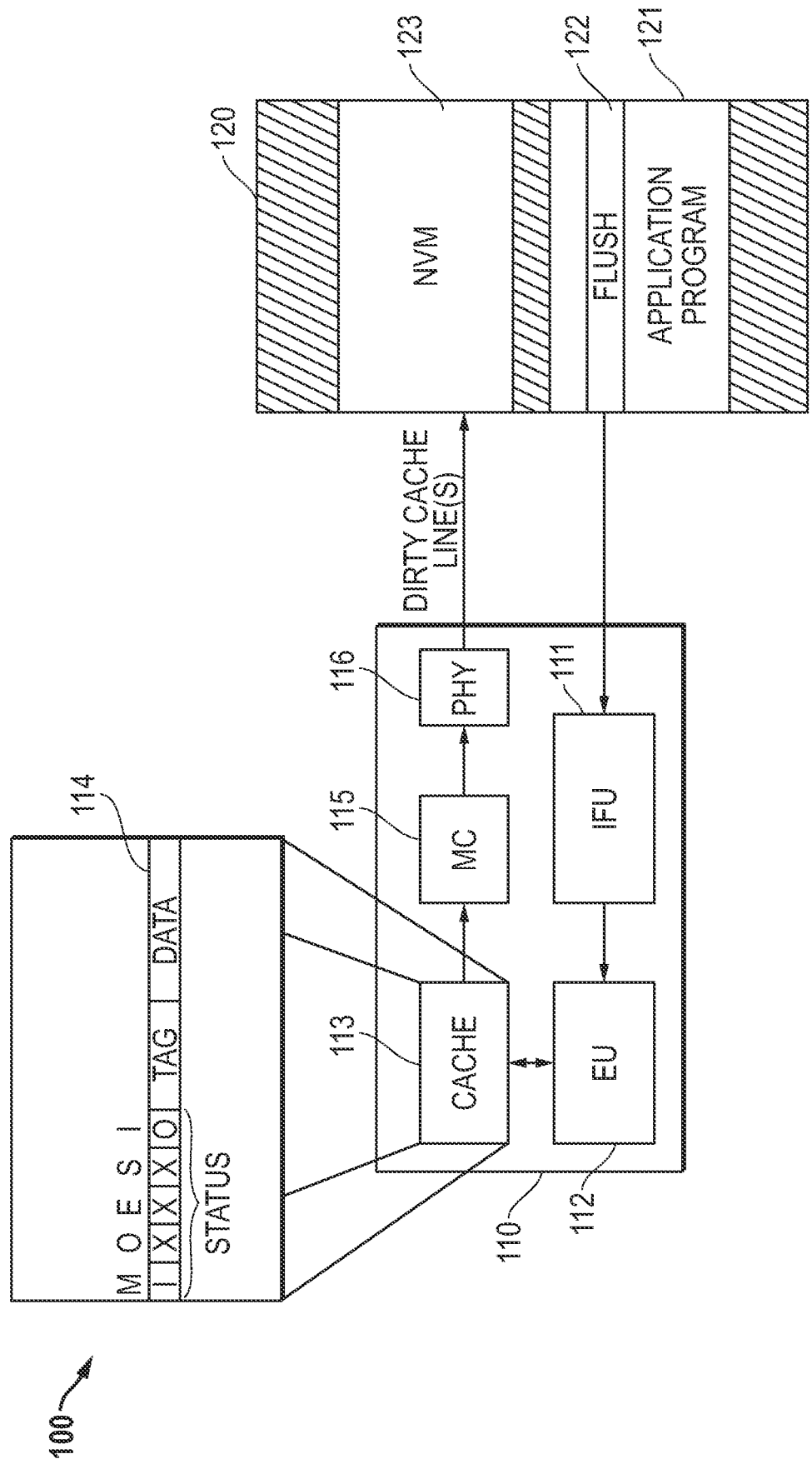
FIG. 1 illustrates in block diagram form a data processing system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described in detail below, a system-on-chip with runtime global push to persistence includes a data processor having a cache, an external memory interface, and a microsequencer. The external memory interface is coupled to the cache and is adapted to be coupled to an external memory. The cache provides data to the external memory interface for storage in the external memory. The microsequencer is coupled to the data processor. In response to a trigger signal, the microsequencer causes the cache to flush the data by sending the data to the external memory interface for transmission to the external memory.

A data processing system with runtime global push to persistence includes a system-on-chip and an external memory coupled to said system-on-chip. The system-on-chip includes a data processor having a cache, an external memory interface, and a microsequencer. The data processor selectively modifies data in the cache in response to executing instructions. The external memory interface is coupled to the cache and is adapted to be coupled to the external memory. The cache selectively provides modified data to the external memory interface for storage in the external memory. The microsequencer is coupled to the data processor and the cache, and in response to a trigger signal, the microsequencer causes the cache to flush the modified data by sending the modified data to the external memory interface for transmission to the external memory.

A method for providing runtime global push to persistence in a system-on-chip including a data processor having a cache coupled to an external memory interface over a data fabric includes receiving a trigger signal. In response to receiving said trigger signal, the data processor is stalled. Dirty data is flushed from the cache by sending corresponding first write requests to the data fabric. All pending write requests are flushed from the data fabric by sending said pending write requests to an external persistent memory. A handshake is provided between the data processor and said external persistent memory, thereby establishing the runtime global push to persistence.

FIG. 1 illustrates in block diagram form a data processing system 100 known in the prior art. Data processing system 100 includes generally a data processor 110 and an external memory 120. Data processor 110 includes an instruction fetch unit 111 labelled "IFU", am execution unit 112 labelled "EU", a cache 113, a memory controller 115 labelled "MC", and a physical interface circuit ("PHY") 116. External memory 120 includes generally a first portion for storing an application program 121 including a FLUSH instruction 122, and a non-volatile memory 123 labelled "NVM".

Data processor 110 includes components whose operations are well-known that are not important to understanding the relevant operation of the present disclosure and will not be discussed further. The components of data processor are connected together for the exchange of various signals, but FIG. 1 shows only one set of signal flow relevant to understanding problems with known data processors.

Cache 113 includes a set of lines that are broken into a tag portion, a data portion, and a status portion. The tag portion helps cache 113 to quickly index into and find the accessed cache line from among its cache lines using a subset of bits of a memory address. The data field stores the data corresponding to the cache line indicated by the TAG. The STATUS field stores information about the line status in the cache that allows the system to maintain data coherency in a complex data processing environment including multiple processors and they associated caches in addition to different forms of main memory. There are several known cache coherency protocols, but cache 113 implements the so-called "MOESI" protocol, which stores M, O, E, S, and I state bits that indicate the cache line is Modified, Owned, Exclusive, Shared, and/or Invalid, respectively. As shown in FIG. 1, a state that indicates dirty data is one in which I=0 and M=1 as shown for cache line 114 in FIG. 1.

Data processing system 100 implements a known technique for ensuring the data is durable. During the execution of application program 121, instruction fetch unit 111 fetches a "FLUSH" command from application program 121. Instruction fetch unit 111 eventually passes the FLUSH command to execution unit 112 for execution. In response to the FLUSH command, execution unit 112 causes cache 113 to flush all of its dirty data to external memory 120. It can do so by having an internal state machine that cycles through valid cache lines and writes them to non-volatile memory 123, or execution unit 112 itself can inspect all cache lines and write the contents of dirty cache lines to non-volatile memory 123. Using either technique, cache 113 provides cache line information with the updated copy of the data to memory controller 115, which eventually provides the data over through PHY 116 to an external data bus to non-volatile memory 123.

There are several problems or limitations of the technique shown in FIG. 1. First, it relies on the application program to initiate the FLUSH operation, and the application program must be aware of the hardware capabilities of data processor 110. In addition, if data processing system 100 implements multiple processors in which data is exchanged between multiple processors using distributed memory that forms one memory pool, then all processors must flush their caches and force serialization between different application threads to ensure a reliable backup and restore point, which may cause a substantial disruption in software operation. In larger, more complex systems, such as systems-on-chip (SOCs) with complex data fabrics for communication between different processing elements, it becomes difficult to predict the amount of time it will take for all writes in the system to propagate to visible memory. Thus this known system seems inadequate to ensure data visibility and durability in the system when needed.

Figure 2:
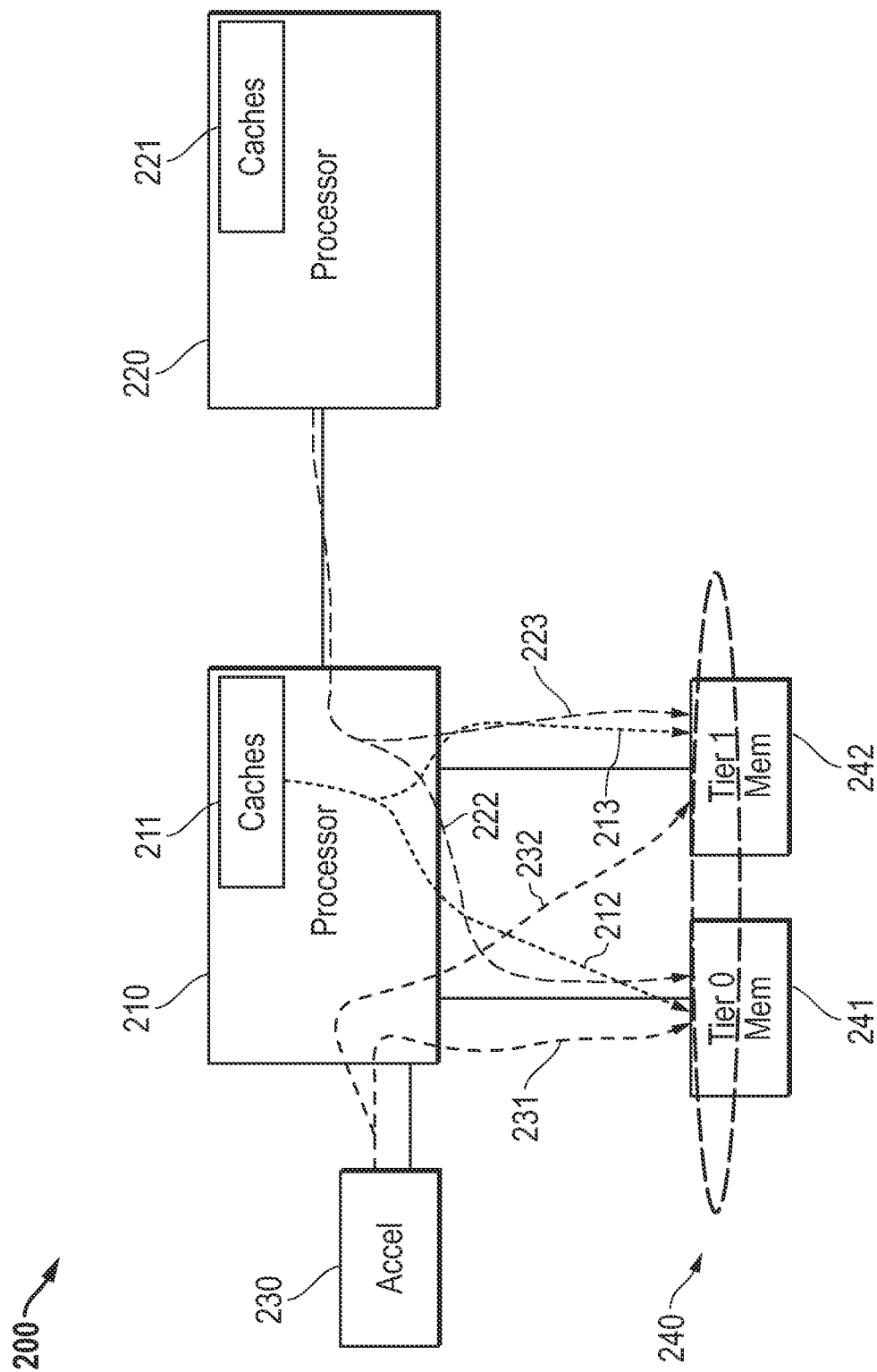
FIG. 2 illustrates in block diagram form a high-level abstraction of a data processing system with runtime global push to persistence according to some embodiments.

FIG. 2 illustrates in block diagram form a high-level abstraction of a data processing system 200 with runtime global push to persistence according to some embodiments. As shown in FIG. 2, data processing system 200 includes processors 210 and 220, an attached accelerator 230, and a memory system 240. Processor 210 has an associated cache 211 and is connected to processor 220, accelerator 230, and memory system 240. Memory system 240 includes two tiers of memory, including a first tier or "Tier 0" memory 241 and a second tier or "Tier 1" memory 242. In one example, Tier 0 memory 241 is a persistent memory such as non-volatile memory, and Tier 1 memory 242 is a volatile memory such as high-speed dynamic random-access memory (DRAM). It would be desirable in certain circumstances for data processing system 200 to perform a runtime global push to persistence operation in which dirty data in caches 211 and 222 and accelerator 230 is moved into the memory system 240 and thus becomes globally observable. As will be explained in more detail below, in response to an event that indicates a need for runtime global push to persistence, processors 210 and 220 cause dirty data in their caches 211 and 221, respectively, to be pushed out to memory system 240. As shown in FIG. 2, cache 211 pushes dirty data to memory 241 and memory 242 via paths 212 and 213, respectively, cache 221 pushes dirty data to memory 241 and memory 242 via paths 222 and 223, respectively, and accelerator 230 would push dirty data indirectly through processor 210 to memory 241 and memory 242 via paths 232 and 233, respectively. In addition, all "in-flight" memory operations in data communication fabrics, buffers, memory controllers, and the like are completed as part of runtime global push to persistence to achieve data durability of the entire system.

Figure 3:
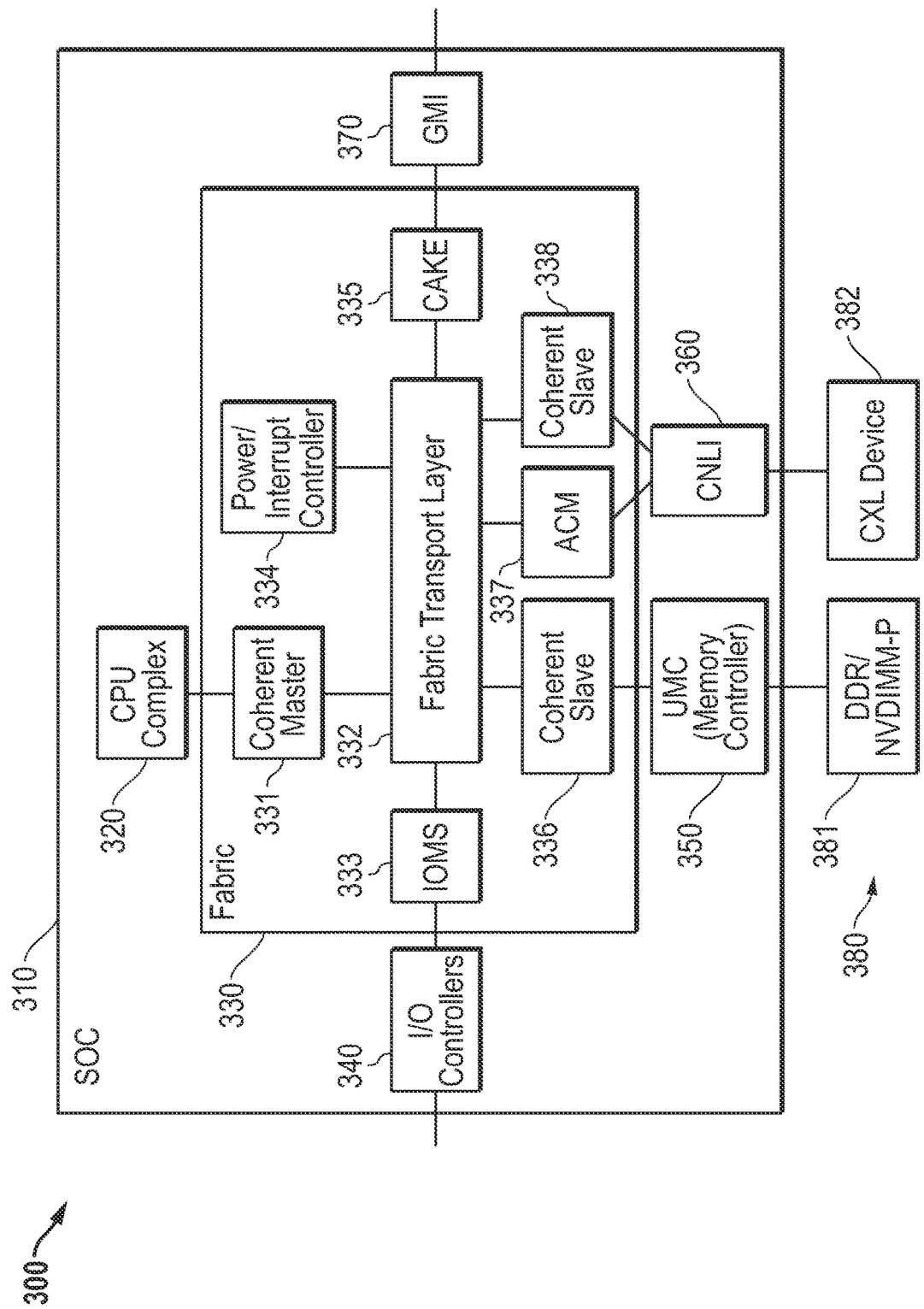
FIG. 3 illustrates in block diagram form a data processing system having an exemplary system-on-chip (SOC) with runtime global push to persistence according to some embodiments.

FIG. 3 illustrates in block diagram form a data processing system 300 having an exemplary system-on-chip (SOC) 310 with runtime global push to durability or persistence according to some embodiments. Data processing system 300 includes generally SOC 210 and a memory system 380. SOC 310 includes a CPU complex 320, a fabric 330, a set of input/output (I/O) controllers 340, a unified memory controller (UMC) 350, a coherent network layer interface (CNLI) 360, and a global memory interface (GMI) controller 370. CPU complex 310 including one or more CPU cores each having one or more dedicated internal caches with a shared cache shared among all the CPU cores. Fabric 330 includes a coherent master 331, an input/output memory slave (IOMS) 333, a power/interrupt controller 334, a coherent AMD socket extender (CAKE) 335, a coherent slave 336, an ACM 337, and a coherent slave 338, all interconnected through a fabric transport layer 332. I/O controllers 340 include various controllers and their physical layer interface circuits for protocols such as Peripheral Component Interconnect Express (PCIe) and the like. UMC 350 performs command buffering, re-ordering, and timing eligibility enforcement for efficient utilization of the bus to external memory, such as double data rate (DDR) and/or non-volatile dual-inline memory module with persistent storage ("NVDIMM-P") memories. CNLI 360 routes traffic to external coherent memory devices. GMI controller 370 performs inter-chip communication to other SOCs that have their own attached storage that is visible to all processors in the memory map. Memory system 380 includes a DDR/

NVDIMM-P memory 381 connected to UMC 350, and a Computer Express Link (CXL) device 382 connected to CNLI 360.

SOC 310 is an exemplary SOC that shows the complexity of fabric 330 that is used to connect various data processor, memory, and I/O components with various storage points for in-process write transactions. For example, coherent slave blocks 336 and 338 support various memory channels and enforce coherency and transaction ordering, and as will be described later, runtime global push to persistence. In the exemplary embodiment, they track coherency and address collisions and support, e.g., 256 outstanding transactions.

Figure 4:
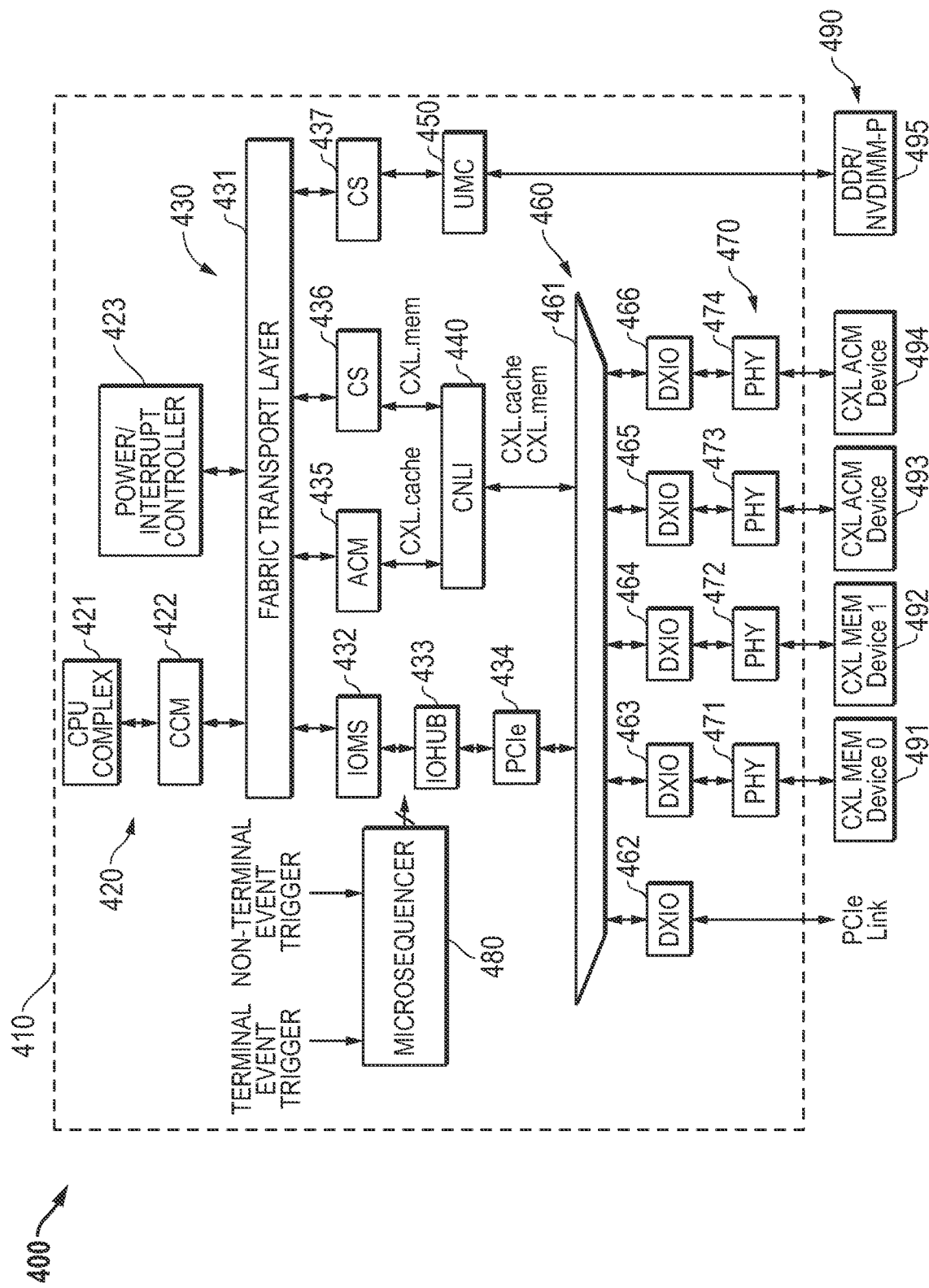
FIG. 4 illustrates in block diagram form another data processing system having an SOC with runtime global push to persistence according to some embodiments.

FIG. 4 illustrates in block diagram form another data processing system 400 having an SOC 410 with runtime global push to persistence according to some embodiments. Data processing system 400 includes SOC 410 and a memory system 490. SOC 410 includes generally a processor layer 420, an interconnect fabric 430, a coherent network layer interface (CNLI) circuit 440, a unified memory controller (UMC) 450, a data input/output block 460, a physical interface layer 470, a microsequencer 480, and a memory system 490.

Processor layer 420 includes a CPU complex 421, a cache coherent memory 422 labelled "CCM", and a power/interrupt controller 423. CPU complex 421 includes one or more CPU cores that each will typically have their own dedicated internal caches. In some embodiments, the dedicated internal caches include both to a first level 1 (L1) cache and a second level (L2) cache connected to the L1 cache. The lowest-level caches of each processor core or cores in CPU complex 421 have interfaces to CCM 422. In some embodiments in which each CPU core has dedicated internal L1 and L2 caches, CCM 422 is a third level (L3) cache shared among all processors in CPU complex 421. Power/interrupt controller 423 has a bidirectional connection for receiving register values and settings and signaling events such as interrupts and resets to circuits in SOC 410, and may also connect directly to other elements in SOC 410 through dedicated or special purpose buses.

Interconnect fabric 430 includes a fabric transport layer 431, an input/output (I/O) master/slave controller 432 labelled "IOMS", an I/O Hub 433 labelled "IOHUB", a peripheral component interconnect express (PCIe) controller 434, a Cache Coherent Interconnect for Accelerators controller 435 labelled "ACM", and coherent slave circuits 436 and 437 each labelled "CS". Fabric transport layer 431 includes an upstream port connected to the downstream port of CCM 422, an upstream port connected to power/interrupt controller 423, and four downstream ports. IOMS 432 has an upstream port connected to a first downstream port of fabric transport layer 431, and a downstream port. I/O hub 433 has an upstream port connected to the downstream port of IOMS 432, and a downstream port. PCIe controller 434 has an upstream port connected to the downstream port of IOHUB 433, and a downstream port. ACM 435 has an upstream port connected to a second downstream port of fabric transport layer 431, and a downstream port for communicating CXL cache transactions labelled "CXL.cache". CS 436 has an upstream port connected to a third downstream port of fabric transport layer 431, and a downstream port for communicating CXL memory transactions labelled "CXL.mem". CS 437 has an upstream port connected to a fourth downstream port of fabric transport layer 431, and a downstream port. IOMS 432 is a high-level controller for input/output device accesses and may include an input/output memory management unit (IOMMU) to remap memory addresses to I/O devices. IOHUB 433 is a storage device for I/O accesses. PCIe controller 434 performs I/O accesses according to the PCIe protocol and allows for deep hierarchies of PCIe switches, bridges, and devices in a deep PCIe fabric. PCIe controller 434 in conjunction with firmware running on one or more processors in CPU complex 421 may form a PCIe root complex. ACM controller 435 receives and fulfills cache coherency requests from one or more external processing accelerators over the communication link. ACM controller 435 instantiates a full CXL master agent having the capability to use a full set of CXL protocol memory transaction types (see FIG. 6) for making and fulfilling memory access requests to memory attached to SOC 410 or other accelerators. CS 436 and 437 route other memory access request initiated from CPU complex 421 in which CS 436 routes CXL traffic and CS 437 routes local memory traffic.

CNLI circuit 440 has a first upstream port connected to the downstream port of ACM 435, a second upstream port connected to the downstream port of CS 436, and a downstream port. CNLI circuit 440 performs network layer protocol activities for the CXL fabric.

UMC 450 has an upstream port connected to the downstream port of CS 437, and a downstream port for connection to an external memory through a physical interface circuit, not shown in FIG. 4. UMC 450 performs command buffering, re-ordering, and timing eligibility enforcement for efficient utilization of the bus between the downstream port of UMC 450 and DDR and/or NVDIMM-P memories.

Data input/output block 460 includes an interconnect block 461 and a set of digital I/O ("DXIO") controllers labelled 462-466. DXIO controllers 462-466 perform the data link layer protocol functions associated with PCIe or CXL transactions, as the case may be. DXIO controller 462 is associated with a PCIe link, and has a separate PCIe compatible physical interface circuit between its output and the PCIe link, not shown in FIG. 4.

Physical interface circuits (PHYs) 470 include four individual PHY circuits 471-474, each connected between a respective DXIO controller and a respective I/O port of SOC 410 and adapted to connect to a different external CXL device. PHYs 471-474 perform the physical layer interface functions according to the CXL communication protocol.

Microsequencer 480 has a first input for receiving a signal labeled "TERMINAL EVENT TRIGGER", a second input for receiving a signal labelled "NON-TERMINAL EVENT TRIGGER", and a multiple signal output port connected to various circuits in SOC 410 for providing control signals that will be described further below. SOC 410 includes circuits that generate the TERMINAL EVENT TRIGGER and NON-TERMINAL EVENT TRIGGER signals. These circuits are not shown in FIG. 4 but will be further described below.

Memory system 490 includes a memory 491 connected to the downstream port of PHY 471 that operates as CXL MEM Device 0, a memory 492 connected to the downstream port of PHY 471 that operates as CXL MEM Device 1, a CXL accelerator coherent master controller (ACM) 493 connected to the downstream port of PHY 473, a CXL ACM 494 connected to the downstream port of PHY 474, and a storage class memory in form of a double data rate (DDR) DRAM/NVDIMM-P memory 495 connected to the downstream port of UMC 450.

As should be apparent, the data interface and distributed memory hierarchy of a current-generation SOCs like SOC 410 is extremely complex, layered, and distributed. This complex interconnect fabric presents challenges for supporting runtime global push to persistence in a data processing system that are addressed by the techniques described herein.

Microsequencer 480 is a hardware controller that offloads application software, operating system, or system firmware from the task of recognizing and responding to runtime global push to persistence requirements. First, it causes all caches in SOC 410 to flush their dirty data by writing the updated contents to memory. The flushing could be accomplished either by firmware running on microsequencer 480 that examines the status of each line in each cache in SOC 410, and selectively causes dirty cache lines to be written to memory, or preferably by an explicit hardware signal to each of the caches that cause them to automatically flush dirty data by examining all cache lines and writing cache lines that contain dirty data to main memory. A per cache way Dirty indication can speed up the process of cache flushing. Those cache ways which Dirty indication is cleared, can be skipped by the cache flush process.

Second, microsequencer 480 causes each in-flight memory write transaction present somewhere in interconnect fabric 430 or other interface circuits to complete and drain through any buffer point in the interconnect fabric to external persistent memory. In one example, fabric transport layer 431 may have a buffer that stores read and write commands to the memory system. In response to a trigger signal, microsequencer 480 causes fabric transport layer 431 to push all writes out to the memory system and allows them to pass any reads. In another example, UMC 450 stores DRAM writes in its internal command queue. In response to a runtime push to persistence trigger, microsequencer 480 causes UMC 450 to send all writes to memory without acting on any pending reads, while continuing to observe efficiency protocols such as a preference for combining writes to open pages over writes to closed pages.

Microsequencer 480 responds differently to two types of triggers. The first type of trigger is a terminal event trigger. A terminal event trigger is an event like a hazardous reset request, an imminent power failure, a thermal overload or "trip" condition, or any other condition that indicates the need to imminently terminate the operation of data processing system 400. In response to a terminal event trigger condition, microsequencer 480 performs two actions. First, it stalls the operation of all data processors. Then, it commands all caches and buffers in the data fabric to flush all pending memory transactions to persistent memory. In this way, microsequencer 480 prioritizes speed over low power consumption because of the need to push data to persistent non-volatile memory as quickly as possible.

The second type of trigger is a non-terminal event trigger. A non-terminal event trigger is a non-critical event like encountering a certain address, detecting low processor utilization, encountering a certain time-of-day, detecting a certain elapsed time since a previous runtime global push to persistence operation, or detecting a certain level of "dirtiness" in one or more caches. The non-terminal event trigger allows the system to push highly important data like journal logs, shadow paging, etc. to external persistent memory on a periodic basis. In the case of a non-terminal event trigger, microsequencer 480 does not stall any data processor core, but causes the caches to send all dirty data in any cache to the memory interface without stalling the data processor, allows the data fabric to push out the data naturally, and resumes operation without a reset. Thus, in response to a non-terminal trigger event, microsequencer 480 enforces runtime global push to persistence while requiring only low power consumption.

In response to a persistency loss, which may be identified by the platform by setting the "loss" flag in the non-volatile memory, application software restarts at the last known-to-be-trusted state, i.e. it performs a checkpoint rollback and replay. For example, in some configurations, a "persistence lost" error is logged, and on boot-up, the system basic input-output system (BIOS) firmware identifies the persistence loss and reports through the Advanced Configuration and Power Interface (ACPI) "NFIT" object. In the other embodiments "persistence loss" is captured in the log so that the operating system can learn directly about the event.

Figure 5:
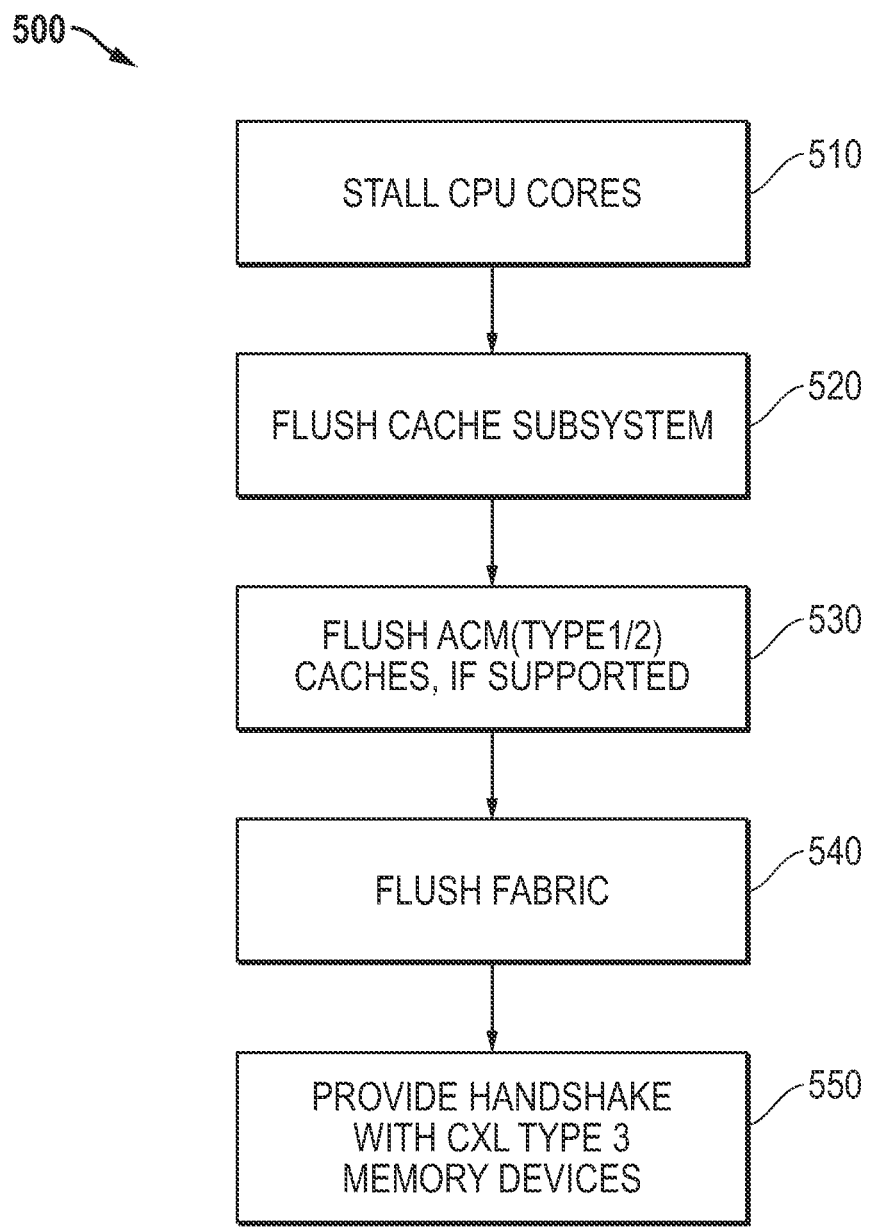
FIG. 5 illustrates a flow diagram of a runtime process useful in an SOC according to some embodiments.

FIG. 5 illustrates a flow diagram of a runtime global push to persistence process 500 useful in an SOC according to some embodiments. Runtime global push to persistence process 500 is initiated, for example, in response to a trigger event indicated by the SOC receiving a trigger signal. In an action box 510, if the trigger was a terminal event trigger, the data processor is stalled by, e.g., stalling each of a set of CPU cores. In an action box 520, dirty data is flushed from the cache subsystem by sending write requests for the dirty data to the data fabric. Next in an action box 530, dirty data from any CXL ACM controller is flushed from coherent memory attached to the external memory interface. This action includes reading the dirty data from external CXL memory devices into the on-chip data fabric. After this operation is complete, in an action box 540 the runtime global push to persistence process flushes all pending write requests in the data fabric by sending the write requests to an external persistent memory. The external persistent memory can be, for example, CXL Type 3 memory devices (CXL memory with no accelerator) or NVDIMM-P. Then at action box 550, the system provides a handshake with CXL Type 3 memory devices.

Figure 6:
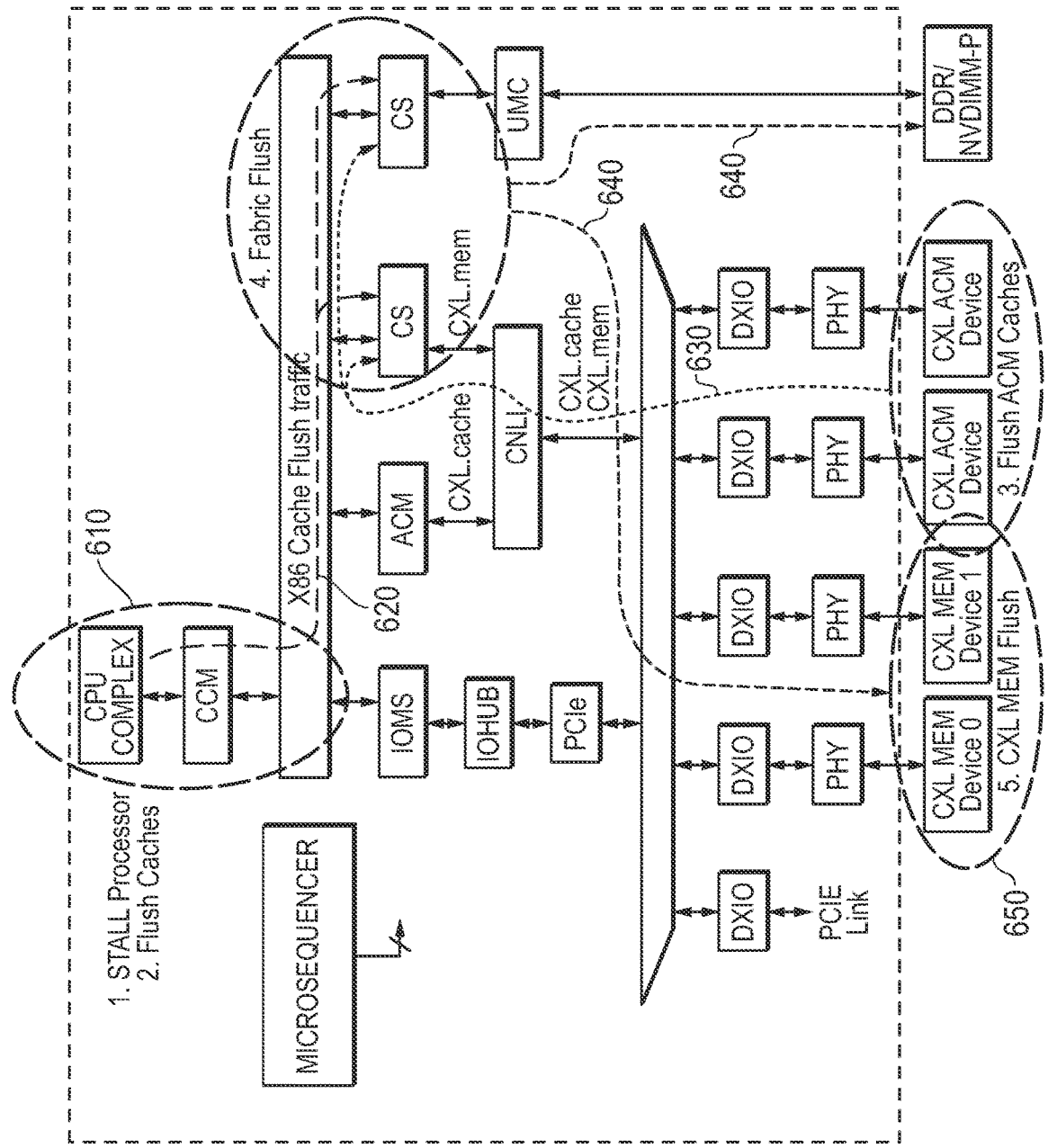
FIG. 6 illustrates in block diagram form a data processing system showing the SOC of FIG. 4 performing the runtime global push to persistence process of FIG. 5 according to some embodiments.

FIG. 6 illustrates in block diagram form a data processing system 600 showing SOC 410 of FIG. 4 performing runtime global push to persistence process 500 of FIG. 5 according to some embodiments. The reference numbers of various blocks of data processing system 400 are not shown in FIG. 6. In a first step shown by dashed circle 610, all processors in CPU complex 421 are stalled. In a second step shown by dashed arrow 620, dirty data is flushed from the cache subsystem of each processor in CPU complex 421 by sending write requests with the dirty data to the data fabric. These requests flow through fabric transport layer 431 and are stored in CS 436 (if the memory is mapped to CXL memory devices 491 or 492) or CS 437 (if the memory is mapped to NVDIMM-P 495). In a third step, dirty data from ACM caches (if present) is flushed and the data is sent through the data fabric to either CS 436 or CS 437 as shown by arrow 630. In a fourth step, the data fabric is flushed as shown by arrows 640 by sending the data either to CXL memory devices 491 or 492, or to NVDIMM-P 495. Finally, SOC 410 provides a handshake with CXL memory devices 491 and 492 according to the CXL protocol.

Figure 7:
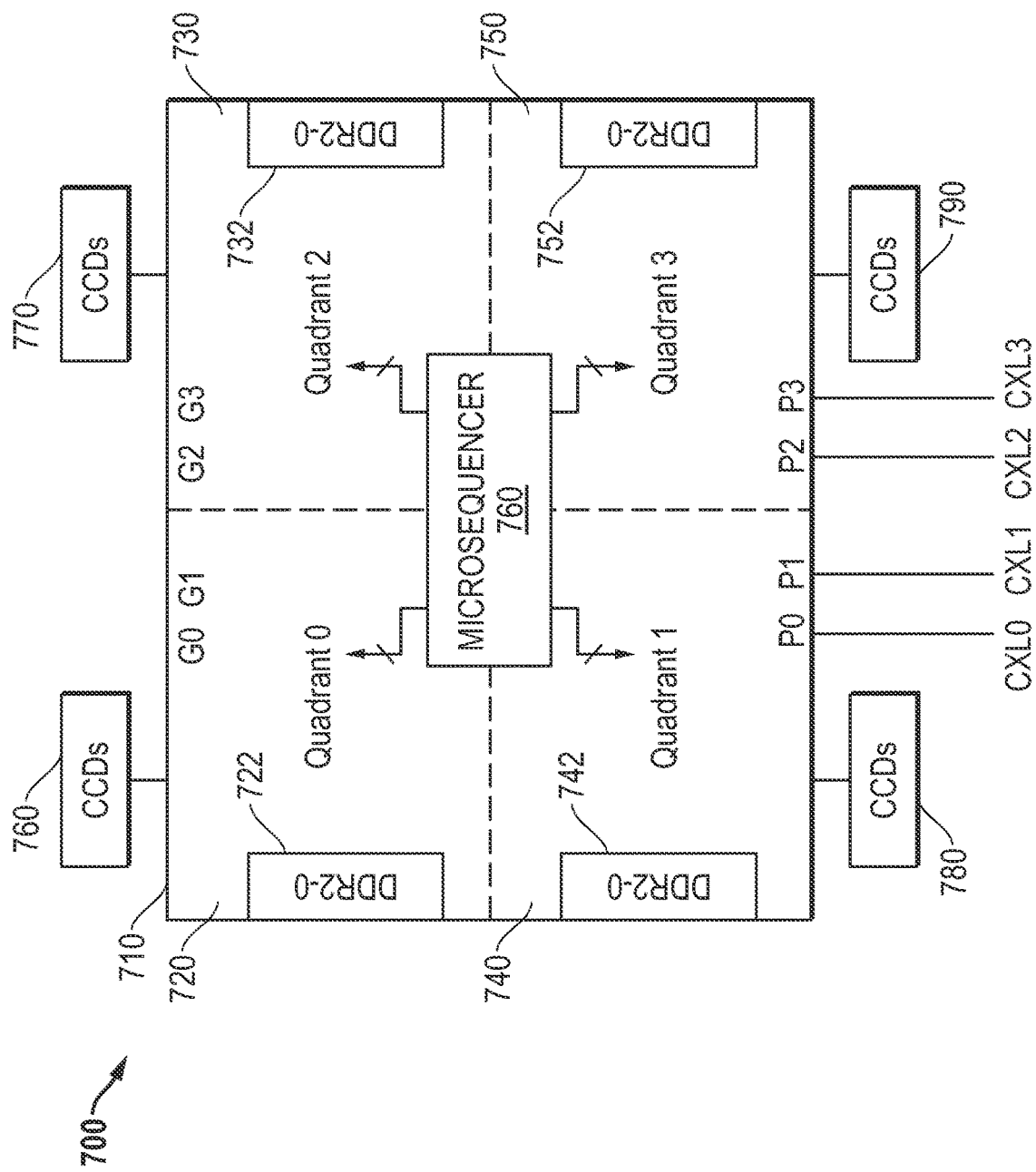
FIG. 7 illustrates in block diagram form yet another data processing system having an SOC with runtime global push to persistence according to some embodiments.

FIG. 7 illustrates in block diagram form yet another data processing system 700 having an SOC 710 with runtime global push to persistence, according to some embodiments. SOC 710 is more highly integrated that SOC 410 of FIG. 4 and is organized into four fairly autonomous quadrants 720, 730, 740, and 750 labelled "Quadrant 0", "Quadrant 1", "Quadrant 2", and "Quadrant 3", respectively. Quadrants 720, 730, 740, and 750 have respective DDR memory interfaces 722, 732, 742, and 752, and interfaces to external cache coherent devices (CCDs) 760, 770, 780, and 790. SOC 710, however, has a set of shared ports labelled "P0", P1", P2", and "P3" for connection to external CXL devices such as CXL Type 3 attached storage that would be nonvolatile and capable to storing data for durability. Moreover because at least some trigger events, such as imminent chip-wide power loss or hazardous reset, require all quadrants to be flushed, a common microsequencer 760 conveniently provides control signals to force runtime global push to persistence by flushing dirty data from both quadrant-specific resources and shared resources such as a common chip-wide data fabric.

Figure 8:
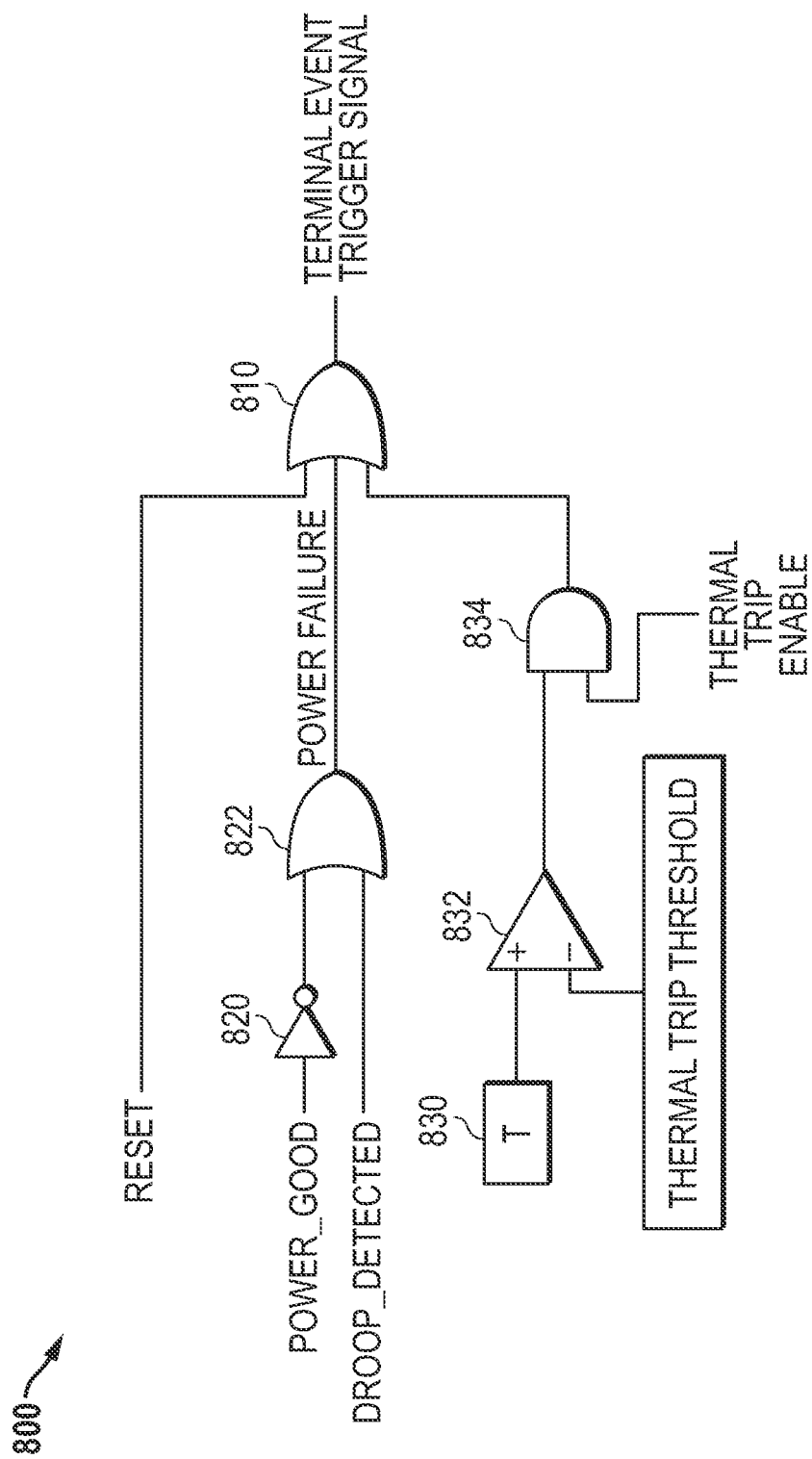
FIG. 8 illustrates in block diagram form a terminal event trigger generating circuit useful in the SOCs of FIGS. 4 and 7.

FIG. 8 illustrates in block diagram form a terminal event trigger generating circuit 800 useful in SOCs 410 of FIG. 4. Terminal event trigger generating circuit 800 includes an OR gate 810, an inverter 820, an OR gate 822, a temperature sensor 830, a comparator 832, and an AND gate 834. OR gate 810 is a 3-input OR gate having a first input for receiving a reset signal labelled "RESET", a second input for receiving a signal labelled "POWER FAILURE", a third input for receiving a signal labelled "THREMAL TRIP", and an output for providing the TERMINAL EVENT TRIGGER SIGNAL. Inverter 820 has an input for receiving a signal labelled "POWER_GOOD" and an output. OR gate 822 has a first input connected to the output of inverter 820, a second input for receiving a signal labelled "DROOP_DETECTED", and an output connected to the second input of OR gate 810 for providing the POWER FAILURE signal thereto. Temperature sensor 830 has an output for providing a measured temperature sense signal. Comparator 832 has a non-inverting input connected to the output of temperature sensor 830, an inverting input for receiving a value labelled "TEMPERATURE TRIP THRESHOLD", and an output. AND gate 834 is a 2-input AND gate having a first input connected to the output of comparator 832, a second input for receiving a signal labelled "THERMAL TRIP ENABLE", and an output connected to the third input of OR gate 810 for providing the THERMAL TRIP signal thereto.

Terminal event trigger generating circuit 800 provides the TERMINAL EVENT TRIGGER SIGNAL in response to a reset condition, a power loss condition, or a thermal trip condition. The reset condition is indicated by an activation of the RESET signal which could be generated by, for example, a software reset or a hardware reset caused by, for example, the user hitting a reset button. The power loss condition is indicated by the activation of a system power signal, as shown in FIG. 8 by the deactivation of the POWER_GOOD signal from a motherboard or system main board, or an on-chip condition such as a detection of a droop in the power supply. The thermal trip condition, when enabled, is detected by on-chip temperature sensor 830 indicating a temperature of the SOC exceeds the terminal thermal trip threshold. In any case, terminal event trigger generating circuit 800 provides the TERMINAL EVENT TRIGGER SIGNAL in response to a serious system condition in which a total system shutdown will or may occur. In this case the activation of the TERMINAL EVENT TRIGGER SIGNAL will inform the microsequencer that preservation of data should take place as soon as possible to avoid losing system state.

It should be apparent that terminal event trigger generating circuit 800 shows a representative set of conditions that constitute terminal events, but that other embodiments will only detect some of the conditions, while in yet other embodiments will detect other conditions indicating a terminal event.

Figure 9:
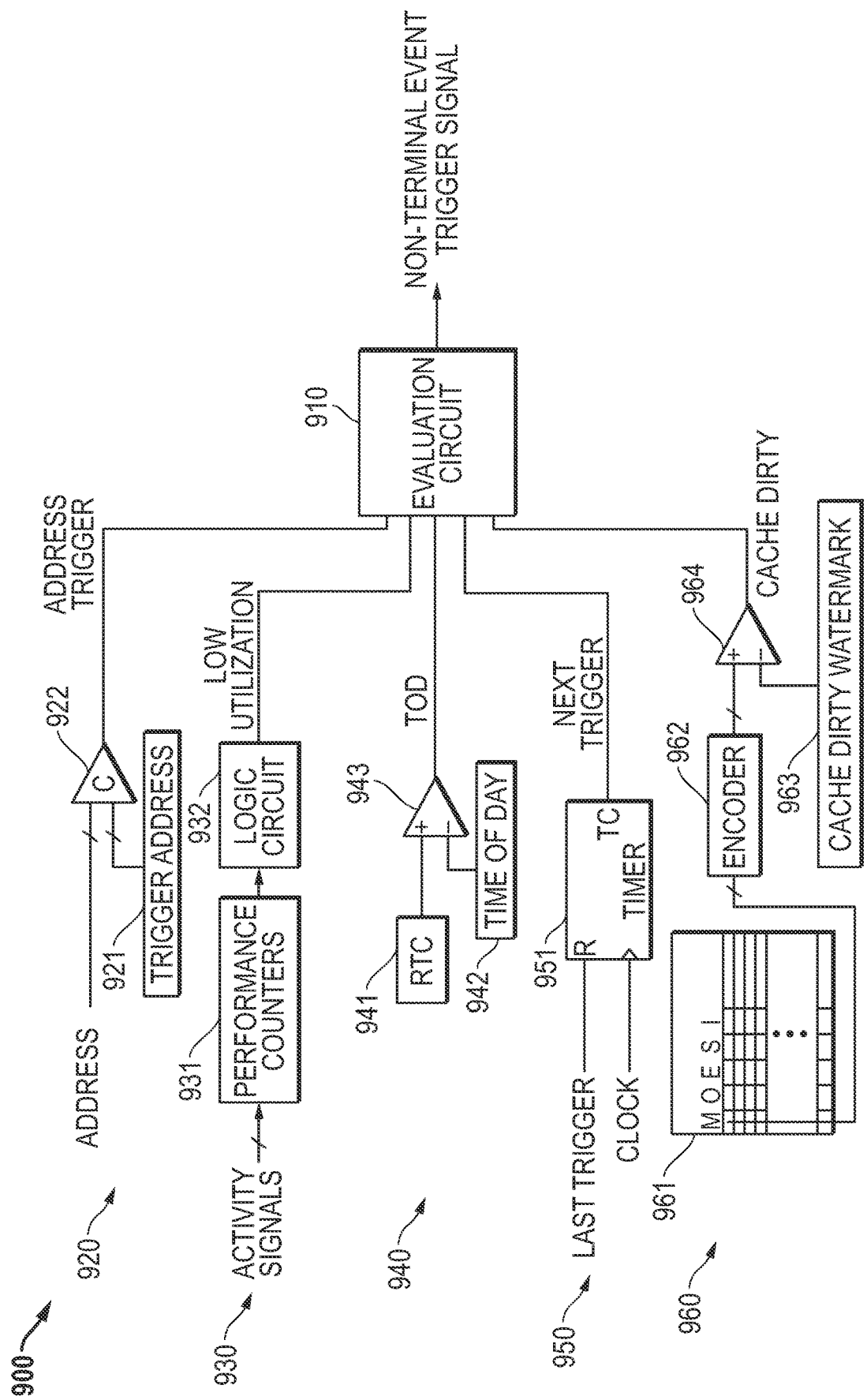
FIG. 9 illustrates in block diagram form a non-terminal event trigger generating circuit useful in the SOCs of FIGS. 4 and 7.

FIG. 9 illustrates in block diagram form a non-terminal event trigger generating circuit 900 useful in SOC 410 of FIG. 4 and SOC 700 of FIG. 7. Non-terminal event trigger generating circuit 900 includes generally an evaluation circuit 910, an address trigger circuit 920, an activity trigger circuit 930, a time-of-day trigger circuit 940, an elapsed time trigger circuit 950, and a cache dirtiness trigger circuit 960.

Evaluation circuit 910 includes a set of inputs for receiving trigger signals, and an output for providing the NON-TERMINAL EVENT TRIGGER SIGNAL. Evaluation circuit 910 generally implements a logical-OR operation between the inputs in which it activated the NON-TERMINAL EVENT TRIGGER SIGNAL in response to an activation of any one of the inputs. Depending on the design it may also have a resettable clocked latch such as that the NON-TERMINAL EVENT TRIGGER SIGNAL is activated only on a certain edge of a clock signal, and is reset in response to, for example, the handshake signal indicating a completion of the runtime global push to persistence operation.

Address trigger circuit 920 includes a trigger address register 921 and a comparator 922. Trigger address register 921 is programmable in a privileged execution state and has an output for providing the stored trigger address. Comparator 922 is a multiple-bit digital comparator having a first input for receiving an address signal labelled "ADDRESS", a second input connected to the output of trigger address register 921, and an output for providing a signal labelled "ADDRESS TRIGGER" to the first input of evaluation circuit 910. Address trigger circuit 920 is a simple example of a trigger circuit that allows an application program or operating system to trigger a runtime global push to persistence operation by accessing a certain address. In data processing systems with multiple CPU cores and multi-threaded operating systems, the exemplary circuitry in address trigger circuit 920 would be replicated for each CPU core.

Activity trigger circuit 930 includes a set of performance counters 931 and a logic circuit 932. Performance counters 931 are responsive to a set of activity signal that are representative of the activity of a CPU core and aggregate individual events using respective counters. Performance counters 931 have an output for providing the states of the counters. Logic circuit 932 has an input connected to the output of performance counters 931, and an output for providing a signal labelled "LOW UTILIZATION" to a second input of evaluation circuit 910. In the example shown in FIG. 9, logic circuit 932 can determine which activities constitute significant events. In the case of the LOW UTILIZATION signal, logic circuit 932 can count instructions executed per unit of time and activate the LOW UTILIZATION signal in response to detecting the instructions executed per unit of time being less than a threshold. As with address trigger circuit 920, the exemplary circuit 930 would be replicated for each CPU core in a multi-core system.

Time-of-day trigger circuit 940 includes a real time clock circuit 941 labelled "RTC" a time of day register 942, and a comparator 943. RTC 941 has an output for providing a digital count value representative of the current time of day. Register 942 has an output for providing a selected time of day, for example 4:00 AM. Comparator 943 has a first input connected to the output of real time clock 941, a second input connected to the output of register 942, and an output for providing a time of day match sign labelled "TOD" to a third input of evaluation circuit 910. Time-of-day trigger circuit 940 is an example of a non-terminal event that would not need to be replicated for each CPU core of a multiple CPU core system.

Elapsed time trigger circuit 950 includes a timer 951. Timer 951 has a reset input for receiving a signal labeled "LAST TRIGGER", a clock input for receiving a clock signal labelled "CLOCK", and an terminal count (TC)

output for providing a signal labelled "NEXT TRIGGER" to a fourth input of evaluation circuit 910. Elapsed time trigger circuit 950 is another example of a non-terminal event that would not need to be replicated for each CPU core of a multiple CPU core system.

Cache dirtiness trigger circuit 960 includes a cache 961, an encoder 962, a cache dirty watermark 963, and a comparator 964. Cache 961 is a cache of a CPU core or is a cache shared between multiple CPU cores. In the example shown in FIG. 9, cache 961 implements the MOESI status protocol described above. Encoder 962 has an input connected to cache 961, and an output, and counts the number of cache lines that are dirty. The logic is a little more complicated than shown in cache dirtiness trigger circuit 960 because encoder 961 would count not just the number of cache lines with the M bits set, but with both the M bit set and the I bit cleared. Cache dirtiness watermark register 963 is programmable in a privileged execution state and has an output for providing the stored cache dirty watermark. Comparator 964 has a positive input connected to the output of encoder 962, a negative input connected to the output of cache dirtiness watermark register 963, and an output connected to the fifth input of evaluation circuit 910 for providing a signal labelled "CACHE DIRTY" thereto. Comparator 964 provides its output in an active logic state in response to the number of dirty lines in cache 961 exceeding the cache dirty watermark. Cache dirtiness trigger circuit 960 would be replicated for each cache in the SOC.

It should be apparent that non-terminal event trigger generating circuit 900 shows a representative set of conditions that constitute non-terminal events, but that other embodiments will only detect some of the conditions, while in yet other embodiments will detect other conditions indicating a non-terminal event. Moreover, evaluation circuit can implement a simple logical OR function, or can implement a fuzzy logic evaluation based on a combination of factors.

Thus, a data processing system, SOC, and method have been disclosed that implement a runtime global push to persistence operation. This runtime operation causes important data to be flushed from the cache hierarchies of each CPU core, and then flushed with other pending operations from the on-chip data fabric and stored in external persistent memory. The runtime global push to persistence operation allows important data to be protected and preserved and allows the data processing system to back up to a known operating point in the case of sudden or unexpected system failure. There are two types of operations that in various embodiments can trigger a runtime global push to persistence operation: a terminal event, and a non-terminal event. The particular trigger events supported by the SOC may vary between embodiments.

Although microsequencer 480 and its associated trigger generating circuits 800 and 900 have been described as being hardware circuits, their functions may be implemented with various combinations of hardware and software. Some of the software components may be stored in a computer readable storage medium for execution by at least one processor. Moreover, some or all of the method illustrated in FIG. 5 may also be governed by instructions that are stored in a computer readable storage medium and that are executed by at least one processor. Each of the operations shown in FIG. 5 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

SOC 410 and microsequencer 480 or any portion thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the conditions that generate a terminal event trigger signal or a non-terminal event trigger signal may very between embodiments. Moreover, in various embodiments, the coincidence of two or more conditions may be used to generate trigger event signals. The interconnect protocols described herein are exemplary and in other embodiments other protocols may be used. The SOC topology and cache hierarchies supported will vary in other embodiments. The status bits that are used to indicate dirty cache lines will also vary in other embodiments. As shown and described herein, various circuits are directly connected together, but in other embodiments, they may be indirectly connected through various intermediate circuits and signals may be transmitted between circuits by various electrical and optical signaling techniques.

Accordingly, it is intended by the appended claims to cover all modifications of the disclosed embodiments that fall within the scope of the disclosed embodiments.

What is claimed is:

1. A system-on-chip with runtime global push to persistence, comprising:
   a data processor having a cache;
   an external memory interface coupled to said cache and adapted to be coupled to an external memory;
   wherein said cache provides data to said external memory interface for storage in the external memory; and
   a microsequencer coupled to said data processor, wherein in response to a trigger signal, said microsequencer causes said cache to flush said data by sending said data to said external memory interface for transmission to the external memory, wherein:
   said data processor is coupled to said external memory interface through a data fabric, said data fabric comprising at least one buffer that temporarily stores write requests to the external memory through said external memory interface; and
   said data fabric is further coupled to said microsequencer, and in response to said trigger signal, said microsequencer further causes said data fabric to flush data associated with said write requests stored in said at least one buffer by sending said data to said external memory interface for transmission to the external memory.

2. A system-on-chip with runtime global push to persistence, comprising:
a data processor having a cache;
an external memory interface coupled to said cache and adapted to be coupled to an external memory;
wherein said cache provides data to said external memory interface for storage in the external memory; and
a microsequencer coupled to said data processor, wherein in response to a trigger signal, said microsequencer causes said cache to flush said data by sending said data to said external memory interface for transmission to the external memory, wherein:
said trigger signal comprises one of a terminal event trigger signal and a non-terminal event trigger signal;
in response to said terminal event trigger signal, said microsequencer stalls said data processor before sending said data to said external memory interface for transmission to the external memory; and
in response to said non-terminal event trigger signal, said microsequencer sends said data to said external memory interface for transmission to the external memory without stalling said data processor.

3. The system-on-chip of claim 2, wherein:
the system-on-chip activates said terminal event trigger signal in response to one of: detecting a power failure and detecting a thermal trip condition.

4. The system-on-chip of claim 2, wherein:
the system-on-chip activates said non-terminal event trigger signal in response to one of: a change from a normal operation state to a reset state, an elapsed time since a previous trigger event, a predetermined time-of-day, a state of at least one performance counter, and detecting an access to a predetermined address.

5. The system-on-chip of claim 4, wherein:
the system-on-chip activates said non-terminal event trigger signal in response to said state of at least one performance counter, and said state of at least one performance counter indicates a low utilization of said data processor.

6. The system-on-chip of claim 2, wherein:
the system-on-chip generates said non-terminal event trigger signal in response to a plurality of conditions.

7. The system-on-chip of claim 6, wherein said plurality of conditions includes at least one of: an execution state of at least one software thread, and a dirtiness condition of said cache.

8. The system-on-chip of claim 2, wherein in response to said trigger signal, said microsequencer causes said cache to flush modified data selectively based on whether an address of said data corresponds to at least one address range.

9. A data processing system with runtime global push to persistence, comprising:
a system-on-chip; and
an external memory coupled to said system-on-chip,
wherein said system-on-chip comprises:
a data processor having a cache, wherein the data processor selectively modifies data in said cache in response to executing instructions;
an external memory interface coupled to said cache and to said external memory;
wherein said cache selectively provides modified data to said external memory interface for storage in the external memory; and
a microsequencer coupled to said data processor, wherein in response to a trigger signal, said microsequencer causes said data processor to stall an execution of instructions and subsequently to flush said modified data from said cache by sending said modified data to said external memory interface for transmission to said external memory, wherein:
said data processor is coupled to said external memory interface through a data fabric, said data fabric comprising at least one buffer that temporarily stores requests to send said modified data to said external memory interface for transmission to the external memory; and
said data fabric is further coupled to said microsequencer, and in response to said trigger signal, said microsequencer further causes said data fabric to flush said modified data associated with requests stored in said at least one buffer by sending said modified data to said external memory interface for transmission to the external memory.

10. The data processing system of claim 9, wherein:
said external memory comprises non-volatile memory.

11. The data processing system of claim 9, wherein:
in response to said data processor accessing a data element, said cache fetches said data in said cache and places a cache line in said cache in an unmodified state; and
in response to a write access to said data element, said cache modifies said data element according to said write access, and places said data element in a modified state,
said microsequencer causes said data processor to flush said cache by only flushing cache lines that are in said modified state.

12. The data processing system of claim 9, wherein:
said data processor further causes said cache to flush said modified data by sending said modified data to said external memory interface for transmission to the external memory in response to decoding a flush instruction.

13. A data processing system with runtime global push to persistence, comprising:
a system-on-chip; and
an external memory coupled to said system-on-chip,
wherein said system-on-chip comprises:
a data processor having a cache, wherein the data processor selectively modifies data in said cache in response to executing instructions;
an external memory interface coupled to said cache and to said external memory;
wherein said cache selectively provides modified data to said external memory interface for storage in the external memory; and
a microsequencer coupled to said data processor, wherein in response to a trigger signal, said microsequencer causes said data processor to stall an execution of instructions and subsequently to flush said modified data from said cache by sending said modified data to said external memory interface for transmission to said external memory, wherein:
said trigger signal comprises one of a terminal event trigger signal and a non-terminal event trigger signal;
in response to said terminal event trigger signal, said microsequencer stalls said data processor before sending said modified data to said external memory interface for transmission to the external memory; and in response to said non-terminal event trigger signal, said microsequencer sends said modified data to said external memory interface for transmission to the external memory without stalling said data processor.

14. The data processing system of claim 13, wherein:
said trigger signal comprises said terminal event trigger signal and the system-on-chip activates said terminal event trigger signal in response to one of: detecting a power failure and detecting a thermal trip condition.

15. The data processing system of claim 13, wherein:
said trigger signal comprises said non-terminal event trigger signal and the system-on-chip activates said non-terminal event trigger signal in response to one of: a change from a normal operation state to a reset state, an elapsed time since a previous trigger event, a predetermined time-of-day, a state of at least one performance counter, and detecting an access to a predetermined address.

16. The data processing system of claim 15, wherein the system-on-chip generates said non-terminal event trigger signal in response to said state of at least one performance counter, and wherein said state of at least one performance counter indicates a low utilization of said data processor.

17. The data processing system of claim 13, wherein said trigger signal comprises said non-terminal event trigger signal and the system-on-chip generates said non-terminal event trigger signal in response to a plurality of conditions.

18. The data processing system of claim 17, wherein said plurality of conditions includes at least one of: an execution state of at least one software thread, and a dirtiness condition of said cache.

19. The data processing system of claim 13, wherein in response to said trigger signal, said microsequencer causes said cache to flush modified data selectively based on whether an address of said modified data corresponds to at least one address range.

20. A method for providing runtime global push to persistence in a system-on-chip comprising a data processor having a cache coupled to an external memory interface over a data fabric, comprising:
receiving a trigger signal, and in response to receiving said trigger signal:
  stalling the data processor;
  flushing dirty data from the cache by sending corresponding first write requests to the data fabric;
  flushing all pending write requests from the data fabric by sending said pending write requests to an external persistent memory; and
  providing a handshake between the data processor and said external persistent memory, thereby establishing the runtime global push to persistence.

21. The method of claim 20, wherein said flushing said dirty data from the cache comprises:
flushing dirty data from coherent memory coupled to the external memory interface by sending corresponding second write requests to the data fabric prior to flushing all pending write requests from the data fabric.

22. The method of claim 20, further comprising:
generating said trigger signal in response to at least one of a terminal event trigger signal and a non-terminal event trigger signal.

23. The method of claim 22, further comprising:
when said trigger signal is generated in response to said terminal event trigger signal, resetting the data processor after providing said handshake.

24. The method of claim 22, further comprising:
when said trigger signal is generated in response to said non-terminal event trigger signal, causing the data processor to resume operation after providing said handshake.

25. The method of claim 22, further comprising:
controlling said stalling, said flushing dirty data from the cache, said flushing all pending write requests from the data fabric, and providing said handshake using a microsequencer of the data processor.

26. A system-on-chip with runtime global push to persistence, comprising:
a plurality of data processors each having a cache;
an external memory interface coupled to said cache and adapted to be coupled to an external memory;
wherein said cache of each of said plurality of data processors provides respective dirty data to said external memory interface for storage in the external memory; and
a microsequencer coupled to each of said data processors, wherein in response to a trigger signal, said microsequencer causes said cache in each of said plurality of data processors to flush said respective dirty data by sending said respective dirty data to said external memory interface for transmission to said external memory.

27. The system-on-chip of claim 26, wherein:
each of said plurality of data processors is coupled to said external memory interface through a data fabric, said data fabric comprising at least one buffer that temporarily stores write requests to the external memory through said external memory interface; and
said data fabric is further coupled to said microsequencer, and in response to said trigger signal, said microsequencer further causes said data fabric to flush data associated with said write requests stored in said at least one buffer by sending said dirty data to said external memory interface for transmission to the external memory.

28. The system-on-chip of claim 26, wherein:
said trigger signal comprises one of a terminal event trigger signal and a non-terminal event trigger signal;
in response to said terminal event trigger signal, said microsequencer stalls each of said plurality of data processors before sending said dirty data to said external memory interface for transmission to the external memory; and
in response to said non-terminal event trigger signal, said microsequencer sends said dirty data to said external memory interface for transmission to the external memory without stalling said plurality of data processors.

29. The system-on-chip of claim 28, wherein:
the system-on-chip activates said terminal event trigger signal in response to one of: detecting a power failure and detecting a thermal trip condition.

\* \* \* \* \*